April 7, 1959  F. ERBE ET AL  2,881,049
PROCESS OF PREPARING ALKALI METAL SILICATES
Filed Sept. 28, 1954

Friedrich Erbe
Waldemar Kaufmann
Michael Alexander Maikowski
INVENTORS:

BY
Richardson, David and Nordon
ATTORNEYS.

2,881,049
PROCESS OF PREPARING ALKALI METAL SILICATES

Friedrich Erbe, Frankfurt am Main, Waldemar Kaufmann, Maitingen uber Augsburg, and Michael Alexander Maikowski, Frankfurt am Main, Germany, assignors to Farbwerke Hoechst Aktiengesellschaft vormals Meister Lucius & Bruning, Frankfurt am Main, Germany, a corporation of the Federal Republic of Germany Application September 28, 1954, Serial No. 458,744

7 Claims. (Cl. 23—110)

The present invention relates to alkali metal silicates and a process of preparing same.

According to this invention particularly valuable alkali silicates with definite molecular ratios of $Me_2O:SiO_2$ (Me=alkaline metal) can be prepared in the manner indicated below. The products so obtained can be used for a large number of purposes. Their main use is to serve as washing, cleaning and degreasing agents in many industrial branches. For instance, the products can be used for washing industrial fabrics such as filter cloths, work clothing, rags, waste and for treating metal surfaces, for degreasing and for cleaning floors consisting, for instance, of flags or concrete.

The products obtained are valuable alkali metal silicates having definite molecular ratios of $Me_2O:SiO_2$ (in which Me represents an alkali metal). It is to be understood that the term "silica" is used herein to include hydrated silica compounds.

The molecular ratio of $Me_2O:SiO_2$ of the products obtained in accordance with the invention lies between about 1:0.5 and about 1:2. However, products are obtained whose molecular ratio varies within these wide limits only if the reaction is effected while stirring the mixture in the reaction vessel. Without stirring, generally only such products are obtained as have a molecular ratio of $Me_2O:SiO_2$ which ranges between about 1:about 0.66 and about 1:about 1.5. As will be seen from Example 13 below it is possible in special cases to work with ratios outside the above-mentioned ranges. In cases in which the process can be effected without stirring it can, of course, equally well be carried out with stirring.

The process of the invention may be carried out as follows:

Finely divided silica, for instance quartz sand, quartz powder, kieselguhr and the like is homogeneously mixed with aqueous alkali metal hydroxide solution in a proportion corresponding to the desired ratio of $MeO:SiO_2$ in the reaction product, the water content of the mixture being equal to or, in consequence of the evaporation by expansion described below, larger than the water content of the final product. The term "water content," whether in connection with the reaction mixture or the final products, is used herein to mean the precentage of $H_2O$ calculated on the sum of $H_2O+Me_2O+SiO_2$. The starting mixture is introduced into a reaction zone which, for instance, can be formed by a series of successive receptacles through which the reaction mixture flows. Preferably the reaction space is formed like a tube. In the following description of the invention given by way of example only reaction tubes are used, but other designs of reaction vessels may be used. When a tube is used the above mentioned starting mixture is continuously passed under pressure through the tube by means of a pump. The tube is externally heated in part or along its whole length. The heating can be effected in different ways, for instance by a stationary or a circulating liquid, by means of high-pressure steam, gas or electric heating.

The tube ends in an expansion valve which is so adjusted that the quantity of the final product continuously leaving the tube is equal to that of the starting mixture which is introduced by the pump, the pressure prevailing in the tube being of the same magnitude as the steam pressure of the reaction mixture. In the examples, given below, the working pressure always exceeds the steam pressure. This guarantees that in the reaction tube an evaporation which might cause incrustations cannot take place. Mixtures which hardly tend to form incrustations, however, can also be treated at a steam pressure reduced to such extent that steam-bubbles are formed in the reaction tube which favour the mixing of the reaction materials.

The reaction tube can be provided with a stirrer. In 175° C. to about 320° C., the pressure being between about 9 and about 115 atmospheres. Temperatures between 200° C. and 290° C. are preferred at pressures between about 15 and about 80 atmospheres.

The reaction tube can be provided with a stirrer. In this case reaction mixtures can be used in which the ratios of $Me_2O:SiO_2$ range between about 1:05 and about 1:2.

However, it is also possible to work with a reaction tube which does not contain a stirrer. In this case, reaction mixtures can generally be used in which the ratio of $Me_2O:SiO_2$ ranges between about 1:0.66 and about 1:1.5.

When working with stirring it is advisable to choose the dimensions of the tube so that in the case of a given output the following two desiderata are above all, taken into consideration. The useful volume of the tube should be in accordance with the time of dwell to be observed which in the case of the preferred temperature range is between about 2 to about 15 minutes, if the residue of the products insoluble in water is to be less than 1%. Furthermore, it is desirable to design the surface large enough in order to supply the reaction mixture with the amount of heat necessary to reach the reaction temperature. The stirrer to be chosen should be preferably be of such a construction that it glides over the total cylindrical inner surface in a short distance only in order to avoid, at the inner wall, any deposits which would diminish the free cross section and impair the transfer of heat. Besides that, the construction of the stirrer is of minor importance, it may have the form of a worm, more or less perforated, or may be shaped like an anchor or a finger, or it may have a grid- or case-structure.

When using reaction tubes without stirrer it is necessary to select a large enough quantity of mixture to be treated in the tube so that the silica, before having reacted, remains finely distributed in the mixture and does not deposit. The optimum dimensions of the reaction tubes for a fixed throughput cannot be stated generally. As they depend upon the composition and the temperature of the reaction mixture, as well as on the required purity of the final product and the properties of the construction material concerning resistance and heat conduction and upon composition, movement and temperature of the heating medium, they must be fixed separately for each individual case. Useful test conditions are demonstrated in the following examples, but the invention is not restricted thereto.

The time of dwell in the reaction tube can be shortened by introducing the mixture of the starting materials preheated for instance, to a temperature up to the boiling point of the alkali metal hydroxide solution.

All parts of the installation coming into contact with the starting mixture or with the reaction products including pump and expansion valve preferably consist of a material which is not attacked by the alkali hydroxide and/or silicate solutions and which offers a sufficient mechanical resistance against the abrasive effect of the silica particles.

As the silica there may also be used natural hydrated silicon dioxide or quartz, both finely ground, or also kieselguhr or a hydrated silicon dioxide in a finely divided state resulting from a chemical reaction. Preferably fine quartz sand or quartz powder is used. The more finely divided they are the more suitable they are for the realization of the process according to the present invention. In practice mixtures of different sizes of grain are used as they are obtained by grinding and, if required, by subsequent separation of single fractions, for instance by means of screens or wind sifters. The mixtures which can be economically prepared contain particles in sizes ranging between about $0.1\mu$ and about $1,000\mu$ or within narrower limits comprised by these figures. In the mixtures to be used in the present invention the major part is preferably constituted by particles below $100\mu$ or below $70\mu$. A quartz powder, for instance, containing 88% of particles below $100\mu$ and 12% of particles having a size of grain between $100\mu$ and $300\mu$ has been found to give good results.

As alkali metal hydroxide solutions there are to be understood above all aqueous solutions of sodium and potassium hydroxide.

The reaction products can be removed from the reaction tube in different manners by an expansion valve. Thus the pressure can be reduced at the reaction temperature whereby a water evaporation inevitably takes place as the reaction temperature is always above the boiling point at atmospheric pressure. The thus formed steam can be condensed and added again to that part which remained liquid during the expansion. In this manner a product is obtained which has the same water content as corresponds to the composition of the starting mixture. The same result is obtained if the reaction product, before the expansion, is cooled down below its boiling point at atmospheric pressure, which is easily possible for instance when the last part of the reaction tube is provided with a cooling jacket through which water can be passed.

If, however, the steam formed during the expansion is separated by the part which remained liquid, for instance by means of a cyclone, products can be obtained which are essentially poorer in water than corresponds to the composition of the starting mixture.

The evaporation by expansion can still be rendered more effective if the reaction product is heated to a degree exceeding the reaction temperature, for instance by about 50° C., before the expansion starts; on the other hand, a smaller evaporation of water can be obtained if, before the expansion starts, the reaction product is cooled down to a temperature between the boiling temperature at atmospheric pressure and the reaction temperature.

The possibility of applying the evaporation by expansion is of importance from the following point of view. It has been found that the water content of the starting mixture must not be below a certain minimum value. The latter cannot be indicated quite generally. It depends upon the alkali metal hydroxide used, upon the ratio of $Me_2O:SiO_2$ as well as upon the reaction temperature, the flowing and stirring conditions in the reaction tube and other reaction conditions. When preparing sodium metasilicate hydrate melts it amounts, for instance, to 55–60% if a reaction tube without stirrer is used and the temperature of reaction amounts to about 250° C. to about 260° C. More concentrated mixtures as well as the fused masses therefrom are too viscous and tend too much to the separation of solid parts so that they cannot be passed, without causing trouble, through the reaction tube. The water content of the final products would thereby be limited to the above mentioned minimum values. When applying the evaporation by expansion there can be obtained directly, that is without installing a special evaporator connected in series, from starting mixtures, the water content of which is above the minimum water content, products, the water content of which is much smaller than the minimum water content of the starting mixture under the corresponding conditions of reaction.

As regards higher water contents, the use of the process is essentially limited by economical reasons.

The apparatus used in the following examples is schematically represented by Figures 1–3 in the accompanying drawings in which Figure 1 shows the installation used in Examples 5, 8 and 10 in which not only, as is the case in the two other installations, the premixing vessel but also the reaction tube itself is provided with a stirrer.

In the premixing tank 1 the fine-grained silica suspended in alkali metal hydroxide solution is continuously kept in uniform distribution by means of a stirrer 2. From the premixing tank the starting mixture is drawn off through the suction conduit 3 by the pump 4 and introduced into the reaction tube 5. The reaction tube has a length of 1150 mm. and an internal diameter of 32 mm. It is provided with a strong rapidly rotating case-stirrer 6 (300 r.p.m.) the longitudinal axis of which concides with the longitudinal axis of the tube and the shaft ends of which are running in the two stuffing boxes 7. It keeps the reaction mixture moving in such a manner that on the one hand an intense mixing of those portions takes place which are in the same section in a vertical direction to the longitudinal axis of the reaction tube that, on the other hand, however, the reaction product leaving the tube at its end is not contaminated by the non-reacted silica entering at the head of the tube. From the reaction tube the effective volume of which—that is to say, the volume through which the solution flows—amounts to 580 cc. the reaction product passes into a tube 8 of a length of 1 metre and a width of 6.6 mm. which is provided with a heating or cooling jacket 9 and which serves for adjusting the temperature of expansion measured by means of a thermometer 10. The expression "expansion temperature" whenever it occurs means the temperature of the continuously flowing melt at the expansion valve. The pressure prevailing in the reaction tube is measured by means of the pressure gauge 11 and adjusted to the desired value by means of the throttle valve 12 which, in connection with the expansion nozzle 13 serves to effect the expansion of the reaction product to atmospheric pressure. From the expansion nozzle the alkali silicate solution or melt is passed into the collecting vessel 14 and is, according to the composition of the product, used in this state or it is crystallized. The reaction tube is heated by oil conducted in a cycle. The heating oil is conveyed by the circulation pump 15 through the gas-heated oil heater 16, flows through the heating jacket 17 surrounding the reaction tube, in the same direction as the reaction mixture and, after having left the heating jacket, flows back to the pump. The thermometers 18 and 19 control the temperature of the heating oil at the head and/or the end of the heating jacket. The tank 20 is adapted to receive overflow oil resulting from thermal expansion of the heating oil. All parts of the apparatus coming into contact with the starting mixture or with the reaction product are of an alkali-resistant material.

Figure 2 shows a schematic view of the installation used in Examples 1, 2, 3 and 11.

Figure 1:
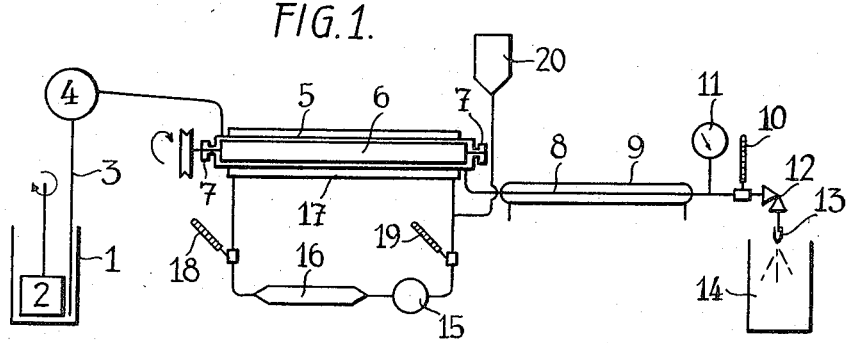

In the premixing tank 1 the fine-grained silica suspended in alkali metal hydroxide solution is continuously kept uniformly distributed by means of a stirrer 2. From the premixing tank the starting mixture is drawn off through the suction conduit 3 by the pump 4 and introduced into the reaction tube 5 which has the form of a spiral, a length of 15 metres and a width of 6.6 mm. The reaction tube as well as all metallic parts of the installation coming into contact with the starting mixture or the reaction product consists of alkali resistant steel. It is placed in an electrically heated oil bath 6. From the reaction tube proper the reaction product flows into the tube 7 having a length of 1 metre and a width of 6.6 mm. surrounded by a heating and/or cooling jacket 8 which regulates the expansion temperature measured by means of the thermometer 9. The pressure prevailing in the reaction tube is measured by means of the pressure gauge 10 and adjusted to the desired value by means of the throttle valve 11 which, in connection with the expansion nozzle 12 serves to expand the reaction product to atmospheric pressure. From the expansion nozzle the alkali metal silicate solution or melt flows into the collecting tank 13 and is, according to the composition of the product, used as such or crystallized.

Figure 3:
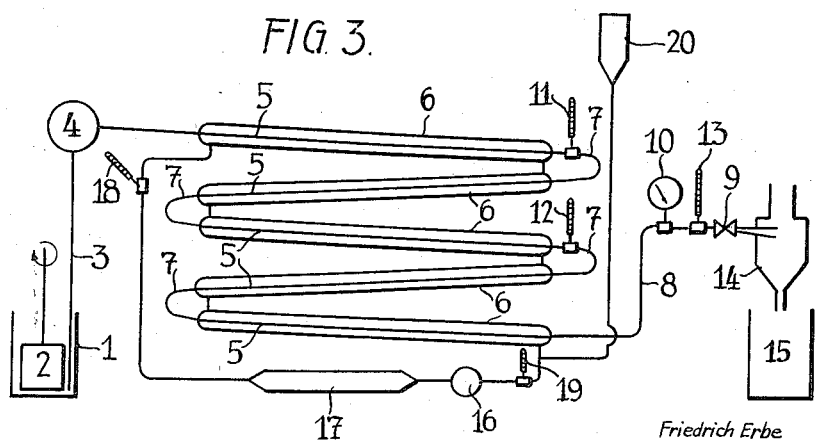

Figure 3 shows a schematic view of the apparatus used in Examples 4, 6, 7, 9, 12, 13 and 14. The fine-grained silica suspended in alkali metal hydroxide solution is continuously kept uniformly distributed in the premixing tank 1 by the stirrer 2. From the premixing tank the starting mixture is drawn off through the suction conduit 3 by the pump 4 and introduced into the reaction tube having a total length of 33 metres and a uniform width of 14 mm. The reaction tube consists of 5 straight tube sections of 5.6 metres length 5 each placed in a heating jacket 6 and connected to each other by the unheated curved tubes of 1 metre length 7. From the last of the 5 tubes the reaction product flows through an equally unheated tube of 1 metre length 8 to the throttle valve 9. The latter regulates the pressure prevailing in the reaction tube which is measured by the pressure gauge 10. At the end of the first and of the third of the five jacket tubes and directly before the throttle valve the reaction mixture passes the thermometers 11, 12 and 13 which control the temperatures of reaction and of expansion respectively. Through the throttle valve the reaction product enters a cyclone 14 in which the steam formed during the expansion of the still hot product is separated from the liquid parts. While the steam is drawn off at the top, the alkali metal silicate solution or melt accumulates in the collecting tank 15 and is, according to its composition, used as such or crystallized. The reaction tube is heated by means of oil which is conducted in a cycle. The heating oil is conveyed by the pump 16 through the gas heated oil heater 17, flows through the above-mentioned five heating jackets 6 connected in series in the same direction with the reaction mixture, and, from the end of the last heating jacket, returns to the pump. The thermometers 18 and 19 measure the temperature of the heating oil before the first and behind the fifth heating jacket. The tank 20 stores the excess volume of oil resulting from thermal expansion of the heating oil. All parts of the apparatus coming into contact with the starting mixture or with the reaction product are formed of an alkali-resistant material.

The process can be rendered more advantageous by installing additional apparatus, for instance a measuring off device for the regulated continuous supply of the raw materials in the desired proportions, a device by which the working pressure is kept temporarily constant by automatic adjustment of the expansion valve and an installation for the automatic regulation of the temperature. These measures may be applied singly or combined with one another.

The special advantage of the process of the present invention resides in the extraordinarily short time of dwell required for a practically complete conversion whereby the volume needed for any particular capacity is very small. A further advantage is the possibility of obtaining, from only one starting mixture, alkali silicate solutions and/or melts of a different water content, without applying additional measures but merely by selecting an appropriate temperature of expansion. In this connection it is particularly important that final products relatively poor in water can be obtained from starting mixtures which can be easily treated and are of a high water percentage.

To the group of solutions and of water-containing melts of alkali metal silicates which can be obtained in accordance with the invention there also belong melts of sodium metasilicate with water percentages up to 37%. When being cooled they solidify to solid, crystallized hydrates. The process according to the invention offers the possibility of continuously preparing such crystallized sodium metasilicate hydrates by conducting the continuously obtained crystallizable melt, advantageously after or during its cooling to the optimum crystallization temperature, to a connected apparatus in which the crystallization takes place with elimination of the crystallization heat, if required by adding seed crystals.

From solutions of sodium metasilicate which contain more than about 42% up to about 90% of water and, in addition, may contain sodium hydroxide up to a ratio of $Na_2O:SiO_2=2:1$ and also belong to the group of the substances which can be prepared according to the invention, sodium metasilicate hydrates can crystallize out, a mother liquor being left behind. Thereby, the process according to the invention offers the possibility of continuously preparing such crystallized hydrates, for instance the hydrate containing 9 molecules of $H_2O$ per molecule of silicate, by conducting the continuously obtained solution of the above mentioned composition, usefully after or during its cooling to or below the respective temperature of equilibrium between crystals and the mother liquor, through a crystallizing apparatus from which the resulting mixture of crystals and mother liquor is passed into separating apparatuses, for instance centrifuges. The crystallizing and separating devices required therefor are generally known.

Finally, the aqueous solutions or water containing melts obtained in accordance with the invention can be converted into solid products poor in water or free of water by evaporating the total or the larger part of the water in special evaporators.

The following examples serve to illustrate the invention, but they are not intended to limit it thereto, the parts being by weight unless otherwise stated.

*Example 1*

Figure 2:
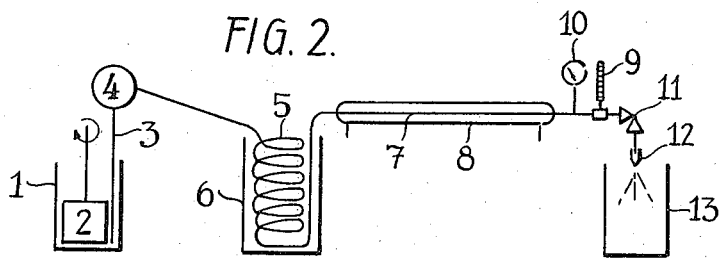
Figures 2 and 3 show installations in which the premixing vessel is provided with a stirrer but in which the reaction mixture in the reaction tube proper, however, is maintained uniformly distributed without the use of a stirring device.

From a mixing tank a suspension at a temperature of about 80° C. and consisting of 17.7 parts of quartz powder in 82.3 parts of sodium hydroxide solution of 28.7% strength which is continuously kept in uniform distribution by means of a stirrer, is forced continuously by means of a pump, into a tube made of steel resistant to alkali and of 16 metres length and 6.6 mm. width (see Fig. 2). The pressure in the reaction tube is maintained at 60–70 atmospheres. 1.5% of the quartz powder particles used have a grain diameter of between 70μ and 150μ, the remaining 98.5% having a diameter of below 70μ. The throughput per hour amounts to 14.4 kgs. of starting mixture. The first 15 metres of the tube are surrounded by an oil bath having a temperature of 260° C. This section represents the reaction tube proper. The time which the mixture stays in this section amounts to about 3 minutes. The following part of the tube having a length of 1 metre which may be cooled or heated, serves for adjusting the desired temperature of expansion which partly determines the water content of the melt formed. At its end the melt is continuously expanded to atmospheric pressure by means of a throttle valve. In the present example the expansion takes place at 220°

C. The sodium metasilicate hydrate formed is, after the crystallization of the melt, soluble in water, leaving a residue of 0.08% only part thereof being $SiO_2$. The water content of the product amounts to 55.6% corresponding to 8.5 molecules of $H_2O$ per molecule of $Na_2SiO_3$. The weighed portion is so calculated that the melt contains 64.0% of water before the expansion takes place.

*Example 2*

A suspension of 18.7 parts of quartz powder in 81.3 parts of sodium hydroxide solution of 30.7% strength is reacted by continuously forcing it by means of a pump into a reaction tube having a length of 15 metres and a width of 6.6 mm. (see Fig. 2) and consisting of alkali-resistant steel. The pressure in the reaction tube is maintained at 60–70 atmospheres. The reaction tube is followed by a tube of 1 metre length and 6.6 mm. width which can be cooled or heated and which serves for adjusting the expansion temperature. 12% of the quartz powder particles used have a diameter of grain of between 100μ and 300μ, the remaining 88% a diameter of grain of below 100μ. The temperature of the mixture in the premixing tank is 70–80° C., the bath temperature 260° C., and the temperature of expansion 200° C. The throughput per hour amounts to 8.44 kgs. of the starting mixture. The time of dwell in the reaction tube itself amounts to about 5 minutes. The sodium metasilicate hydrate melt contains 0.01% of unconverted $SiO_2$. It can be crystallized in a known manner and the crystals formed can be crushed and ground. The water content amounts to 55.52% corresponding to a molecular ratio of $H_2O:Na_2SiO_3$ of 8.5:1. Before the evaporation by expansion the water content of the melt amounts to about 62%.

*Example 3*

A suspension of 18.7 parts of quartz powder in 81.3 parts of sodium hydroxide solution of 30.7% is reacted by continuously forcing it, by means of a pump, into a reaction tube having a length of 15 metres and a width of 6.6 mm. and consisting of alkali resistant steel (see Figure 2). The pressure in the reaction tube is maintained at 60–70 atmospheres. The reaction tube is followed by a tube having a length of 1 metre and a width of 6.6 mm. which can be cooled or heated and which serves for adjusting the temperature of expansion. 1.5% of the quartz powder used consist of particles with a grain diameter between 70μ and 150μ, the remaining 98.5% of particles having a diameter of less than 70μ. The temperature in the premixing tank is 80° C., the temperature of the bath 260° C. The throughput per hour amounts to 14.7 kgs. of starting mixture corresponding to a time dwell of about 3 minutes. The reaction product contains, on an average, 0.06% of a residue insoluble in water, a part of it only being $SiO_2$. When the expansion takes place at 244° C. the water content of the melt formed amounts to 51.3%. At a temperature of expansion of 261° C. the melt contains 48.6% of water. In both cases the melt can be converted, by crystallization, into solid sodium metasilicate hydrate.

*Example 4*

A suspension at a temperature of about 70° C. of 12.3 parts of quartz powder in 87.7 parts of sodium hydroxide solution of 18.7% strength is continuously passed through an alkali-resistant steel tube having a length of 33 metres and an internal diameter of 14 mm., by means of a conveyer pump (see Figure 3). The pressure in the reaction tube is maintained at 60–70 atmospheres. 1.5% of the quartz powder used consists of particles having a grain diameter between 70μ and 150μ, the remaining 98.5% having a diameter less than 70μ. At the end of the tube the product is continuously expanded, by means of a throttle valve, into a cyclone in which the steam formed by the expansion is separated from the solution.

The reaction tube consists of 5 jacket tubes of a length of 5.6 metres each which are mutually connected by unheated curved tubes of 1 metre length each. From the last jacket tube the solution flows through a tube of 1 metre length to the throttle valve. The tube is heated by means of oil conducted in a cycle. The heating jackets of the different jacket tubes are arranged in series, the heating oil passing through them in parallel direction to the reaction mixture. At the entry into the first jacket tube the temperature of the heating oil is 262° C. and at the end of the last jacket tube 250° C. The temperature of the reaction mixture is 232° C. after the first jacket tube, 242° C. after the third jacket tube and 230° C. before the expansion valve. 61.5 kgs. of starting mixture are put through per hour. The time of dwell amounts to about 6 minutes. The sodium metasilicate solution formed has a water content of 75% before the expansion and of 64–65% after the expansion. The total residue insoluble in water amounts to 0.03%–0.05%, only a part thereof being undissolved $SiO_2$.

*Example 5*

A hot suspension at a temperature of 80° C.–90° C. of 26.1 parts of quartz powder in 73.9 parts of sodium hydroxide solution of 47.1% strength are forced, by means of a pump, into a cylindrical reaction tank having a length of 1150 mm. and an internal diameter of 32 mm. (see Figure 1). The pressure in the reaction tube is maintained at 60–70 atmospheres. 1.5% of the quartz powder used consist of particles having a grain diameter between 70μ and 150μ, the remaining 98.5% having a diameter below 70μ. The reaction tube is provided with a strong, rapidly rotating cage stirrer (300 r.p.m.) the axis of revolution of which coincides with the longitudinal axis of the tube. It keeps the mixture moving in such a manner that, on the one hand, the reaction mixture present in the same section of the reaction tube is thoroughly mixed and an incrustation of the inner wall of the tube is avoided, and that, on the other hand, the reaction product leaving the tube at its end is not contaminated by the quartz powder suspension entering the tube at its head. The reaction tube is heated by oil conducted in a cycle. The oil flows through a heating jacket surrounding the reaction tube in parallel direction to the reaction product. The temperature of the oil at the inlet of the heating jacket amounts to 275° C. and at the end of the heating jacket to 265° C.

The volume of the reaction tube through which the reaction mixture passes amounts to 580 cc. In the case of a throughput of 9.44 kgs. of starting mixture per hour the time of dwell in the reaction tube amounts to about 6 minutes. From the reaction tube the reaction mixture flows into a tube having a length of 1 metre and a width of 6.6 mm. which can be cooled or heated and which serves for adjusting the temperature of expansion. If the expansion takes place at 80° C. the water content of the melt formed amounts to 47% corresponding to a hydrate containing 6 molecules of $H_2O$ per molecule of sodium silicate. If the expansion takes place at 200° C. a sodium metasilicate hydrate melt of a water content of 38% is formed, corresponding to about 4 molecules of $H_2O$ per molecule of $Na_2SiO_3$. In both cases the melts can be crystallized in a known manner. The residue insoluble in water amounts to 0.2%, a part thereof only being $SiO_2$.

*Example 6*

In a reaction tube of alkali-resistant steel, having a length of 33 metres and an internal diameter of 14 mm. (see Figure 3) a suspension of 19.2 parts of quartz powder in 80.80 parts of sodium hydroxide solution of 25.3% strength is reacted, with a throughput of 73.0 kgs. of starting mixture per hour corresponding to a time of dwell of about 6 minutes. 1.5% of the quartz powder used consists of particles having a grain diameter betwen 70μ and 150μ, the remaining 98.5% having a diameter inferior to 70μ. The reaction tube consists of 5 jacket tubes of 5.6 metres length each which are connected with each other by unheated curved tubes of 1 metre length each. From the last jacket tube the solution flows through a tube of 1 metre length to be throttle valve by which it is expanded into a cyclone. In the cyclone the steam formed by the expansion of the reaction product is separated from the solution. The reaction tube is heated by means of oil conducted in a cycle. The heating jackets of the different jacket tubes are arranged in series and are passed through by the heating oil in parallel direction to the reaction product. The starting temperature of the heating oil amounts to 262° C., the final temperature to 250° C. The mixture is sucked in at 60° C.–70° C. and forced into the reaction tube, in which a pressure of about 70 atmospheres is maintained. At the end of the first jacket tube it has a temperature of 223° C., at the end of the third jacket tube a temperature of 242° C. and shortly before the expansion valve one of 238° C.; the starting mixture is so prepared that in the reaction tube a solution of a sodium silicate of 35%, having a molecular ratio of $Na_2O:SiO_2=1:1.25$ is formed. During the expansion, the water content is reduced to 55%. The solution formed contains 0.07% of portions insoluble in water, a part thereof only being $SiO_2$.

*Example 7*

A suspension of 15.3 parts of quartz powder in 84.7 parts of sodium hydroxide solution of 30.0% is reacted in a reaction tube consisting of alkali-resistant steel and having a length of 33 metres and an internal diameter of 14 mm. (see Figure 3) with a throughput of 86.58 kgs of starting material per hour, that is, with a time of dwell of about 5 minutes. 1.5% of the quartz powder used consists of particles having a grain diameter between 70μ and 150μ, the remaining 98.5% having a diameter inferior to 70μ. The reaction tube consists of 5 jacket tubes, having a length of 5.6 metres each which are connected to each other by means of unheated curved tubes of 1 metre length each. From the last jacket tube the solution flows through a tube of 1 metre length into the throttle valve by which it is expanded into a cyclone. In the latter the steam formed during the expansion of the reaction product is separated from the solution. The reaction tube is heated by means of oil conducted in a cycle. The heating jackets of the jacket tubes are arranged in series and are passed through by the heating oil in parallel direction to the reaction product. The starting temperature of the heating oil amounts to 264° C. and the final temperature to 250° C. In the mixing tank the mixture has a temperature of 70° C.–80° C.; the temperatures at the end of the first and of the third jacket tubes amount to 220° C. and 244° C., respectively. The expansion takes place at 242° C. The water content of the reaction product amounts to 65%, that of the solution formed during the evaporation by expansion only to 56%. The total insoluble residue of the solution amounts to 0.26%, only a part of it, however, being undissolved $SiO_2$. According to the above mentioned composition of the starting mixture a solution of an alkali silicate with a molecular ratio of $Na_2O:SiO_2=1:0.8$ is formed.

*Example 8*

A starting mixture is used in which the molecular ratio of $Na_2O:SiO_2$ is adjusted to 1:0.66 and which has a water content of 60%, and the temperature of the mixture is 70° C.–80° C. It consists of 23.7 parts of quartz powder and 76.3 parts of sodium hydroxide solution of 27.6%. 1.5% of the quartz powder used consist of particles having a grain diameter betwen 70μ and 150μ, the remaining 98.5% having a diameter of below 70μ. The reaction takes place at a pressure of 60 atmospheres to 70 atmospheres in a cylindrical reaction vessel of alkali-resistant steel, having a length of 1150 mm. and an internal diameter of 32 mm. (see Figure 1). The reaction tube is provided with a strong, rapidly rotating stirrer (300 r.p.m.) running in a casing, the axis of rotation of which coincides with the longitudinal axis of the tube. It keeps the mixture in movement in such a manner that on the one hand, a very intensive mixing of the reaction product present in the same section of the reaction tube takes place, plus avoiding an incrustation of the inner wall of the tube, but that, on the other hand, the reaction product leaving the reaction tube at its end is not contaminated by the quartz powder entering the tube at its head. The reaction tube is heated by means of heating oil conducted in a cycle. The oil flows, in parallel direction to the reaction product, through a heating jacket surrounding the reaction tube. The oil temperature amounts to 255° C. at the inlet of the heating jacket and to 245° C. at its outlet. The volume of the reaction tube passed through by the reaction mixture amounts to 580 cc. With a throughput of 5.7 kgs. of starting mixture per hour the time of dwell in the reaction tube amounts to about 9 minutes. The reaction tube is followed by a tube having a length of 1 metre and a width of 6.6 mm. which can be cooled or heated and which serves for adjusting the temperature of expansion. The expansion takes place at 205° C. The solution formed as the final product shows a total insoluble residue of 0.47%. The ignition loss amounts to 51%.

*Example 9*

A starting mixture of a molecular ratio of $Na_2O:SiO_2=1:0.66$ having a water content of 60% is used, the starting mixture consisting of 15.7 parts of quartz powder and 84.3 parts of sodium hydroxide solution of strength 37.2%. 1.5% of the quartz powder used consist of particles having a grain diameter between 70μ and 150μ, the remaining 98.5% having a diameter below 70μ. The reaction is carried out in a reaction tube of alkali-resistant steel having a length of 33 m. and an internal diameter of 14 mm. (see Figure 3). The reaction tube consists of five jacket tubes of 5.6 metres length each which are connected to each other by unheated curved tubes of 1 metre length each. From the last jacket tube the solution flows through a tube of 1 metre length to the throttle valve by which it is expanded into a cyclone. In the latter the steam formed during the expansion of the reaction product is separated from the solution. The reaction tube is heated by means of oil conducted in a cycle. The heating jackets of the different jacket tubes are arranged in series and are passed through by the heating oil in parallel direction to the reaction product. At an average pressure of 50 atmospheres, 29.5 kgs. of starting mixture are put through per hour. The time of dwell amounts to about 13.5 minutes. The starting temperature of the heating oil amounts to 230° C., the final temperature to 226° C. The mixture is sucked in from the mixing tank at about 70° C. At the end of the first jacket tube it has a temperature of 208° C., and after the third jacket tube 218° C., the expansion taking place at 210° C. The total residue insoluble in water of the formed solution amounts to 0.36%, the water content to 56%.

*Example 10*

A suspension of 26.4 parts of quartz powder in 73.6 parts of sodium hydroxide solution of 23.9% strength is introduced into a cylindrical reaction tube of alkali-resistant steel having a length of 1150 mm. and an internal diameter of 32 mm. (see Figure 1) and reacted. The pressure in the reaction tube is maintained at 60 atmospheres to 70 atmospheres. 1.5% of the quartz powder used consists of particles having a grain diameter of between 70μ and 150μ, the remaining 98.5% a diameter inferior to 70μ. The molecular ratio of Na₂O:SiO₂ in the starting mixture amounts to 1:2, the water content to 60%. The reaction tube is provided with a strong, rapidly rotating cage stirrer (300 r.p.m.) the rotation axis of which coincides with the longitudinal axis of the tube. It keeps the mixture moving in such a manner that, on the one hand, the reaction mixture present in the same section of the reaction tube is very intensely mixed and an incrustation of the inner wall of the tube avoided, but that, on the other hand, however, the reaction product leaving the reaction tube at its end is not contaminated by the quartz powder entering the tube at its head. The reaction tube is heated by means of oil conducted in a cycle. The oil passes a heating jacket surrounding the reaction tube in parallel direction to the reaction product. The temperature of the oil at the inlet of the heating jacket amounts to 260° C., at the end of the heating jacket to 250° C. The volume of the reaction tube passed through by the reaction mixture amounts to 580 cc. With a throughput of 4.6 kgs. of starting mixture per hour the time of dwell in the reaction tube amounts to about 11 minutes. The reaction tube is followed by a tube of 1 metre length and 6.6 mm. width which can be cooled or heated and which serves for adjusting the temperature of expansion. The starting mixture is sucked in at 80° C. and the reaction product is expanded at 220° C. By the evaporation by expansion a sodium silicate solution is formed which contains 51% of water and 0.94% of parts insoluble in water.

Example 11

A mixture of 20.1 parts of quartz powder in 79.9 parts of an aqueous solution of potassium hydroxide of 47.1% strength is reacted in a reaction tube of alkali-resistant steel having a length of 15 metres and an internal diameter of 6.6 mm. (see Figure 2). 1.5% of the quartz powder used consist of particles having a grain diameter of between 70μ and 150μ, the remaining 98.5% a diameter of below 70μ. The starting mixture is so calculated that in the case of a complete decomposition a solution of the composition $K_2SiO_3 \cdot 8H_2O$ is formed in the reaction tube. 6.5 kgs. of the starting mixture are put through per hour. The time of dwell amounts to about 8 minutes, the average pressure in the reaction tube to 70 atmospheres. The reaction tube in the form of a spiral is located in an oil bath of 260° C. The reaction tube is followed by a tube of 1 metre length and 6.6 mm. width, which can be cooled or heated and which serves for adjusting the temperature of expansion. The expansion of the reaction product takes place at 194° C. The solution resulting from the evaporation by expansion still contains 0.52% of parts insoluble in water. The water content amounts to 39.5%.

Example 12

A mixture of 19.6 parts of quartz powder in 80.4 parts of an aqueous solution of potassium hydroxide of 30.2% is reacted in a reaction tube of alkali-resistant steel, having a length of 33 metres and an internal diameter of 14 mm. (see Figure 3). The molecular ratio of K₂O:SiO₂ of the starting mixture amounts to 1:1.5, the water content to 60%. 1.5% of the quartz powder used consists of particles having a grain diameter of between 70μ and 150μ, the remaining 98.5% having a diameter below 70μ. The reaction tube consists of five jacket tubes of 5.6 metres length each, which are connected to each other by unheated curved tubes of 1 metre length each. From the last jacket tube the solution flows through a tube of 1 metre length into the throttle valve by which it is expanded into a cyclone. In the latter the steam formed during the expansion of the reaction product is separated from the solution. The reaction tube is heated by means of oil conducted in a cycle. The heating jackets of the different jacket tubes are arranged in series and are passed through by the heating oil in parallel direction to the reaction product. The starting temperature of the heating oil amounts to 266° C., its final temperature to 256° C. The average pressure in the reaction tube amounts to 70 atmospheres. The starting mixture is sucked in at 80° C., at the end of the first jacket tube it reaches 220° C., at the end of the third jacket tube 248° C., and is expanded at 242° C. With a throughput of 43 kgs. of starting mixture per hour the time of dwell of the mixture in the reaction tube amounts to about 10 minutes. During the expansion by evaporation a potassium silicate solution which has a water content of 47% and still contains 0.39% of parts insoluble in water, is produced.

Example 13

In a reaction tube of alkali-resistant steel having a length of 33 metres and an integral diameter of 14 mm. (see Figure 3) a starting mixture is reacted which, on complete conversion and avoidance of a considerable evaporation of water, would, during the expansion, yield a solution of potassium orthosilicate of 30% strength. The starting mixture contains 7.26 parts of quartz powder and 92.74 parts of an aqueous solution of potassium hydroxide of 29.3% strength. 1.5% of the quartz powder used consist of particles having a grain diameter of between 70μ and 150μ, the remaining 98.5% having a diameter of below 70μ. The reaction tube consists of 5 jacket tubes of 5.6 metres length each which are connected to each other by unheated curved tubes of 1 metre length each. From the last jacket tube the solution passes through a tube of 1 metre length to the throttle valve by which it is expanded into a cyclone. In the cyclone the steam formed during the expansion of the reaction product is separated from the solution. The reaction tube is heated by means of heating oil conducted in a cycle. The heating jackets of the different jacket tubes are arranged in series and the heating oil flows through them in a parallel direction to the reaction mixture. At a throughput of 51.7 kgs. of starting mixture per hour the time of dwell amounts to about 8 minutes. The starting temperature of the heating oil amounts to 264° C., and the final temperature to 250° C. The mixture is sucked in at about 80° C. and has reached a temperature of 242° C., at the end of the first jacket tube. At the end of the third jacket tube its temperature amounts to 264° C. The average pressure in the reaction tube is adjusted to about 70 atmospheres. The expansion takes place at 240° C. After the evaporation by expansion the potassium orthosilicate solution formed in the reaction tube shows a water content of 63% and contains only 0.04% of parts insoluble in water.

We claim:

1. A process for producing hydrous alkali metal silicates by reaction under pressure of finely suspended silica with an aqueous alkali metal hydroxide solution, which comprises continuously passing a homogeneous suspension of finely suspended silica in an aqueous alkali metal hydroxide solution through a pressurized reaction zone heated to a temperature between about 175° C. and about 320° C., maintaining the water content constant during the entire duration of the reaction mixture in the reaction zone, said water content being higher than that desired in the final product, and after completion of the reaction adjusting the water content to that desired in the final product by expanding the hot reaction product to thereby evaporate the excess water.

2. A process as claimed in claim 1, wherein the suspension of silica in aqueous alkali metal hydroxide solution to be reacted contains an alkali metal oxide and SiO₂ in a molar ratio of about 1:0.66 to about 1:1.5, and the suspension is advanced through the reaction zone without agitation.

3. A process as claimed in claim 1, wherein the suspension of silica in an aqueous alkali metal hydroxide solution to be reacted contains an alkali metal oxide and $SiO_2$ in a molar ratio of about 1:0.5 to about 1:2, and is stirred at least along a part of its way through the reaction zone.

4. A process for producing hydrous alkali metal silicates by reaction under pressure of finely suspended silica with an aqueous alkali metal hydroxide solution, which comprises continuously passing a homogeneous suspension of finely suspended silica in an aqueous alkali metal hydroxide solution through a pressurized reaction zone heated to a temperature between about 175° C. and about 320° C., maintaining the water content constant during the entire duration of the reaction mixture in the reaction zone, cooling the reaction product, and subsequently expanding the cooled reaction product, the temperature to which the reaction product is cooled being such that only a small amount of water evaporates from the reaction product.

5. A process as claimed in claim 4, wherein the suspension of silica in aqueous alkali metal hydroxide solution to be reacted contains an alkali metal oxide and $SiO_2$ in a molar ratio of about 1:0.66 to about 1:1.5, and the suspension is advanced through the reaction zone without agitation.

6. A process as claimed in claim 4, wherein the suspension of silica in an aqueous alkali metal hydroxide solution to be reacted contains an alkali metal oxide and $SiO_2$ in a molar ratio of about 1:0.5 to about 1:2, and is stirred at least along a part of its way through the reaction zone.

7. A process for producing hydrous alkali metal silicates by reaction under pressure of finely suspended silica with an aqueous alkali metal hydroxide solution which comprises mixing together silica and an aqueous alkali metal hydroxide solution so as to yield a homogeneous suspension of finely suspended silica in said solution; continuously introducing said suspension into a pressurized reaction zone; continuously passing said suspension through said reaction zone having a temperature of between about 175° C. and 320° C., while regulating the linear velocity of said suspension so as to ensure a uniform distribution of the silica in said suspension and while maintaining the water content constant when advancing said suspension through the reaction zone; then expanding the product leaving the reaction zone so as to diminish the excess water content of said product to that desired in the final product.

References Cited in the file of this patent

UNITED STATES PATENTS

| | | |
|---|---|---|
| Re. 344 | Hardinge | Jan. 22, 1856 |
| Re. 21,703 | Burkhart et al. | Feb. 4, 1941 |
| 2,161,515 | Jaeger et al. | June 6, 1939 |
| 2,203,614 | Goodwin | June 4, 1940 |

FOREIGN PATENTS

| | | |
|---|---|---|
| 23,391 of 1911 | Great Britain | Mar. 28, 1912 |
| 299,763 | Great Britain | Mar. 14, 1929 |

OTHER REFERENCES

Merrill: "Journal of Chem. Education," vol. 24, No. 6, pages 262, 263, June 1947.